United States Patent
Killilea

(10) Patent No.: US 7,968,641 B2
(45) Date of Patent: Jun. 28, 2011

(54) WATER-DISPERSIBLE POLYURETHANE-VINYL POLYMER COMPOSITIONS

(75) Inventor: T. Howard Killilea, North Oaks, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

(21) Appl. No.: 12/391,916

(22) Filed: Feb. 24, 2009

(65) Prior Publication Data

US 2009/0163651 A1    Jun. 25, 2009

Related U.S. Application Data

(63) Continuation of application No. 10/567,974, filed as application No. PCT/US2004/026133 on Aug. 12, 2004, now abandoned.

(60) Provisional application No. 60/494,667, filed on Aug. 13, 2003.

(51) Int. Cl.
*C08F 8/30* (2006.01)
*C08F 20/00* (2006.01)
*C08F 283/04* (2006.01)
*C08G 18/00* (2006.01)
*C08G 18/08* (2006.01)
*C08G 18/48* (2006.01)
*C08G 63/00* (2006.01)
*C08G 73/00* (2006.01)
*C08J 3/00* (2006.01)
*C08K 3/20* (2006.01)
*C08L 75/00* (2006.01)

(52) U.S. Cl. ........ 524/507; 524/591; 524/839; 524/840; 525/123; 525/440.01; 525/440.07; 525/440.072; 525/455; 525/458

(58) Field of Classification Search .................. 524/507, 524/591, 839, 840; 525/123, 455, 440.01, 525/440.07, 440.072, 458
See application file for complete search history.

(56) References Cited

U.S. PATENT DOCUMENTS

| | | | |
|---|---|---|---|
| 3,959,329 A | 5/1976 | Dieterich et al. | |
| 4,066,591 A | 1/1978 | Scriven et al. | |
| 4,108,814 A | 8/1978 | Reiff et al. | |
| 4,198,330 A | 4/1980 | Kaizerman et al. | |
| 4,201,852 A | 5/1980 | Dieterich | |
| 4,644,030 A | 2/1987 | Loewrigkeit et al. | |
| 4,801,644 A | 1/1989 | Coogan | |
| 4,888,383 A | 12/1989 | Huybrechts | |
| 4,977,207 A | 12/1990 | Hoefer et al. | |
| 5,095,069 A | 3/1992 | Ambrose et al. | |
| 5,104,737 A | 4/1992 | Arora | |
| 5,124,424 A | 6/1992 | Endo et al. | |
| 5,137,961 A | 8/1992 | Goos et al. | |
| 5,173,526 A | 12/1992 | Vijayendran et al. | |
| 5,344,873 A | 9/1994 | Blum | |
| 5,422,392 A | 6/1995 | Floyd et al. | |
| 5,466,772 A | 11/1995 | Angelmayer et al. | |
| 5,530,059 A | 6/1996 | Blount, Jr. et al. | |
| 5,541,251 A | 7/1996 | Bontinck et al. | |
| 5,608,000 A | 3/1997 | Duan et al. | |
| 5,637,639 A | 6/1997 | Duan et al. | |
| 5,662,966 A | 9/1997 | Kobayashi | |
| 5,703,158 A | 12/1997 | Duan et al. | |
| 5,807,919 A | 9/1998 | Duan et al. | |
| 5,834,544 A | 11/1998 | Lin et al. | |
| 5,872,182 A | 2/1999 | Duan et al. | |
| 5,900,457 A | 5/1999 | Duan et al. | |
| 5,916,965 A | 6/1999 | Matsumoto et al. | |
| 6,022,925 A | 2/2000 | Tomko et al. | |
| 6,031,045 A | 2/2000 | Wei et al. | |
| 6,160,076 A | 12/2000 | Reisch et al. | |
| 6,166,127 A | 12/2000 | Tomko | |
| 6,166,150 A | 12/2000 | Wilke et al. | |
| 6,166,165 A | 12/2000 | Chang | |
| 6,191,213 B1 | 2/2001 | Tomko et al. | |
| 6,239,209 B1 | 5/2001 | Yang et al. | |
| 2003/0195285 A1 | 10/2003 | Overbeek | |

FOREIGN PATENT DOCUMENTS

| | | | |
|---|---|---|---|
| JP | 58-032617 | | 2/1983 |
| JP | 03-017113 | | 1/1991 |
| JP | 04-091162 | * | 3/1992 |
| JP | 04-108815 | | 4/1992 |
| JP | 10-110024 | | 4/1998 |
| JP | 10-338731 | | 12/1998 |
| WO | WO 95/23818 | | 9/1995 |
| WO | WO 98/06768 | | 2/1998 |
| WO | WO 0228977 A | | 4/2002 |

OTHER PUBLICATIONS

Supplementary Search Report for EP 04780900.9 of Apr. 3, 2008.
International Search Report for International Application No. PCT/US04/26133 of Dec. 15, 2004.

* cited by examiner

*Primary Examiner* — Patrick D Niland
(74) *Attorney, Agent, or Firm* — IPLM Group, P.A.

(57) ABSTRACT

A polyurethane dispersion is prepared by reacting a hydroxy-functional sulfonated unsaturated alkyd with an isocyanate in the presence of one or more vinyl monomers to form a blend containing the vinyl monomers and a sulfonated polyurethane polymer containing ethylenic groups. The blend is dispersed in water and the vinyl monomers are reacted by free radical polymerization.

23 Claims, No Drawings

WATER-DISPERSIBLE POLYURETHANE-VINYL POLYMER COMPOSITIONS

CROSS-REFERENCE TO RELATED APPLICATIONS

This application is a continuation of U.S. patent application Ser. No. 10/567,974 filed Feb. 10, 2006, which claims priority from PCT Application No. PCT/US2004/026133 filed Aug. 12, 2004, which in turn claims the benefit of U.S. provisional patent application Ser. No. 60/494,667 filed Aug. 13, 2003 (and incorporated herein by reference).

TECHNICAL FIELD

The present invention relates to polyurethane polymers, particularly air-curable water-based polyurethane-vinyl polymer compositions, and more particularly, air-curable water based polyurethane-vinyl polymer dispersions suitable for coatings such as, for example, floor coatings.

BACKGROUND OF THE INVENTION

Polyurethane (PU) polymers are known in the coating industry to be useful as a part of polymeric coatings because they have excellent resistance to abrasion, chemicals and solvents. These polymers can be designed to be highly flexible and very durable. Conventional oil modified polyurethane polymers are prepared in organic solvents such as aliphatic hydrocarbons and applied as clear or pigmented coatings. After application, the solvent is allowed to evaporate and the film cures via crosslinking, by air oxidation of the ethylenic groups attached to the polyurethane backbone. A principal application for these coatings has been as clear coatings for wood flooring. Coating compositions prepared with higher levels of solids will release less hydrocarbon solvent than compositions that have higher amounts of volatile organic compound (VOC) levels.

In an effort to reduce the amount of VOCs released, and maintain performance, manufacturers have been using water dispersible polyurethanes. For example, water-based anionically stabilized polyurethane polymers are prepared by reacting polyols and dihydroxy carboxylic acid compounds with an excess of diisocyanate to provide a carboxy functional prepolymer having NCO terminal groups. The acid groups are neutralized with tertiary amines to provide salt groups. The neutralized prepolymer can be readily dispersed in water. The terminal NCO groups can be reacted with compounds having active hydrogen groups, wherein the active hydrogen groups are more reactive than water, to produce a fully reacted polyurethane polymer. Typically, to facilitate manufacture, the prepolymer is made in the presence of a solvent that is either left in the dispersion, or removed as one of the last steps in production to provide a low solvent or solvent-free product. Solvents that can be easily removed are usually volatile solvents, such as acetone or methyl ethyl ketone. Alternatively, the anionic stabilizing group of the water dispersible polyurethane polymers can be replaced with cationic stabilizing groups or non-ionic stabilizing groups, to facilitate water dispersibility. Generally, the polymers are linear and their films vary from hard and relatively inflexible to soft and highly flexible. The applications for these water-borne urethane polymers include clear and pigmented coatings for concrete, metal, wood, semi-rigid and flexible plastics, rubber, leather, glass fiber sizing, printing inks and adhesives.

The water-based polyurethane polymers are usually linear polymers. These polymers produce films that have chemical resistance lower than the highly crosslinked films of two component solvent-borne urethane systems. Preparing the polyurethane coating compositions by pre-crosslinking a water-based polyurethane polymer can be accomplished by incorporating a large amount of monomers(s) that have more than two reactive functional groups in the prepolymer stage. However, this results in highly viscous prepolymer blends that cannot be easily dispersed in water. Products using a high percentage of pre-crosslinking of the prepolymer at the dispersion stage, or using chain extenders having more than two reactive functional groups, can result in significant gelling of the polymer.

SUMMARY OF THE INVENTION

Due to increasing environmental restrictions on VOC levels in coating systems, there is a need in the coatings industry for low solvent or solvent free polymer systems. There is a further need for stable and self-crosslinkable polyurethane-polyethylene compositions that are air-curable polyurethane-polyethylene compositions that dry rapidly at room temperature and can produce a crosslinked coating that is resistant to abrasions, chemicals and stains. There is a further need for stable one component self crosslinkable ethylenic containing polyurethane-polyethylene compositions that dry rapidly at room temperature.

The present invention provides water dispersible polyurethane-vinyl polymer compositions (or dispersions) having a sulfonated polyurethane polymer and a vinyl polymer (second polymer). The polyurethane polymer is a reaction product of a polyisocyanate and a sulfonated polyol. Optionally, the polyurethane polymer includes a chain extension agent containing an active hydrogen atom. The sulfonated polyurethane polymers of the invention include ethylenic groups in appended chains. The vinyl polymer is prepared from ethylenically unsaturated monomers.

In addition, the instant invention provides a process for producing water dispersible polyurethane-vinyl polymer compositions (or dispersions) having a sulfonated polyurethane polymer and a vinyl polymer. Incorporation of dicarboxylic acid sulfo-monomers or salts thereof, such as, for example, 5-(sodiosulfo)isophthalic acid (SSIPA), 5-(lithiosulfo)isophthalic acid (LSIPA) and the like, into the backbone of a urethane functional polymer provides water dispersible polyurethane resins that do not require amine neutralizers, which can contribute to the VOC. However, it is acceptable to employ small amounts of amine neutralizers. The invention provides a process wherein the ethylenically unsaturated monomers can function as reactive diluents in place of organic solvents during the polyurethane polymerization stage. The use of ethylenically unsaturated monomers as reactive diluents provides a method to prepare low, e.g., zero, VOC polyurethane dispersions, for example, fatty acid and/or oil modified polyurethane dispersions.

The invention also provides polyurethane polymer compositions having low or substantially zero VOC. The compositions will have a VOC of less than about 5% based on the total weight of the composition. Preferably, the VOC of the composition is less than about 3% based on the total weight of the composition. More preferably, the VOC of the composition is less than about 1% based on the total weight of the composition. Most preferably, the VOC of the composition is substantially zero % based on the total weight of the composition. The compositions of the invention are self-crosslinkable oil and/or fatty acid modified polyurethane-vinyl polymer compositions that are air-curable, dry rapidly at room temperature, and produce a coating that is resistant to abrasions, chemicals and stains.

These and other advantages of the present invention will become more apparent by referring to the detailed description and illustrative examples of the invention.

DETAILED DESCRIPTION

In one embodiment, this invention relates to a water dispersible polyurethane-vinyl polymer composition including (a) a sulfonated polyurethane polymer comprising the reaction product of a polyisocyanate and a sulfonated polyol; and (b) a second polymer prepared from ethylenically unsaturated monomers; wherein the sulfonated polyurethane polymer includes ethylenic groups. Optionally, the polyurethane polymer includes a chain extension agent containing active hydrogen atoms.

The invention also provides low or zero VOC polyurethane compositions having rapid drying times including functional polyurethane resins having dicarboxylic acid sulfo-monomers incorporated therein and a polymer prepared from ethylenically unsaturated monomers used as a reactive diluent. A specific advantage of these compositions would be the development of a substantially zero VOC composition which would have a substantial dry time advantage over existing solvent borne technology. Experimental results demonstrate the compositions of the invention achieve tack free dry 4-5 times faster than state of the art solvent based systems. The SSIPA/LSIPA functional polyurethanes of the invention are suitable for one-component applications on wood flooring where excellent toughness, chemical and water resistance, and early dry times are required.

The following definitions are used, unless otherwise described: "alkyl" denotes both straight and branched groups, but reference to an individual radical such as "propyl" embraces only the straight chain radical, and "isopropyl" specifically refers to the branched chain isomer.

Specific and preferred values listed below for radicals, substituents, and ranges, are for illustration only; they do not exclude other defined values or other values within defined ranges for the radicals and substituents. Specifically, ($C_1$-$C_{10}$) alkyl can be methyl, ethyl, propyl, isopropyl, butyl, iso-butyl, sec-butyl, tert-butyl, pentyl, 3-pentyl, methylpentyl, hexyl, 2-hexyl, heptyl, 2-heptyl, 3-heptyl, octyl, nonyl or decyl.

The term "active hydrogen atom" refers to a compound having hydrogen atoms which can be easily extracted from the compound. For example, an active hydrogen atom includes hydrogen atoms attached to oxygen, nitrogen, or sulfur, and compounds in practicing the invention will include those having at least two of these groups (in any combination) —OH, —SH, and —NH—. The active hydrogen groups can be attached to aliphatic, aromatic, cycloaliphatic compounds or a mixture thereof.

The term "(meth)acrylic" as used herein refers to both the acrylic or methacrylic species, i.e., acrylic acid or methacrylic acid. The term "(meth)acrylate" as used herein refers to both the acrylate or methacrylate species, i.e., acrylate esters or methacrylate esters. The term "poly(meth)acrylate polymer" as used herein refers to both the acrylate or methacrylate polymers or mixtures thereof.

The term "reactive diluents" as used herein refers to unsaturated monomers including acids such as, for example, acrylic acid, methacrylic acid, and the like; esters such as, for example, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, 2-(acetoacetoxy)ethylmethacrylate, and the like; hydroxy functional acrylates such as, for example, hydroxyethyl acrylate, hydroxyethyl methacrylate and the like; amides such as, for example, acrylamide, methylacrylamide, diacetone acrylamide, and the like; vinyl monomers such as, for example, styrene, α-methyl styrene, vinyl toluene, and the like; vinyl esters such as, for example, vinyl acetate, vinyl propionate, and the like, or mixtures thereof.

As used herein the term "isocyanate" refers to organic compounds having at least two —NCO groups that can react with a compound having an active hydrogen atom. The term isocyanate includes diisocyanates, triisocyanates and other polyisocyanates.

As used herein the term "pigment" refers to an organic or inorganic material that imparts color to another substance or mixture. A "colorant" refers to a substance that imparts color to another substance or mixture, and generally includes pigment and other additives. A "tinting agent" similarly refers to a color-imparting agent.

The water dispersible polyurethane-vinyl polymer compositions (dispersions) of the invention have accelerated dry times. The compositions are prepared with ethylenically unsaturated monomers utilized as reactive diluents. These compositions can be prepared having both high Tg and high molecular weight. These dispersions have excellent tack free times, e.g., low times, and a rapid cure. The results show that the dispersions of the invention dry (are tack free) 4-5 times faster than state of the art solvent based systems. The polyurethane dispersions of the invention are particularly suited for one-component applications in wood flooring where excellent toughness, chemical and water resistance, and rapid dry times are required.

The water dispersible polyurethane-vinyl polymer compositions (dispersions) may include a reaction product of hydroxy functional alkyds. The hydroxy functional alkyds can be prepared by any method known in the art, and may or may not contain sulfonate functionality. An example of a method to prepare an alkyd could include the alcoholysis of an oil and polyol with a further reaction with polybasic acids and optionally, further polyols. In addition, polybasic acids and fatty acids can be reacted with polyols in suitable proportions, e.g., with an excess of hydroxy groups to prepare the alkyds. Monoglycerides and diglycerides may also be utilized in place of the hydroxy functional alkyd. Suitable monoglycerides and diglycerides can be readily synthesized using conventional techniques. In addition esters of polyols synthesized via the reaction of at least one fatty acid and a polyol can be used.

The sulfonated dicarboxylic acid monomers useful in practicing the invention include compounds having sulfonate groups present in the form of alkali metal salts such as, for example, lithium, sodium or potassium. Also, the sulfonate groups can be present in the form of ammonium, tertiary amine, copper, or iron salts. Non-limiting examples of monomers with sulfonate groups include 5-(sodiosulfo)isophthalic acid (SSIPA), 5-(lithiosulfo)isophthalic acid (LSIPA) and the like.

Suitable oils and/or fatty acids derived therefrom useful in practicing the present invention include compounds such as, for example, linseed oil, safflower oil, tall oil, cottonseed oil, ground nut oil, tung oil, wood oil, ricinene oil or, preferably, sunflower oil, soya oil, castor oil, dehydrated castor oil and the like. These oils or fatty acids can be used alone or as a mixture of one or more of the oils or fatty acids. Preferred fatty acids are soya fatty acids, dehydrated castor fatty acids, linolenic fatty acids, ricinoleic fatty acids, and linoleic fatty acids.

Suitable polyols useful in practicing the present invention include compounds such as, for example, aliphatic, cycloaliphatic and/or araliphatic alcohols having 1 to 6, preferably 1 to 4, hydroxy groups attached to nonaromatic or aromatic carbon atoms. Examples of suitable polyols include ethylene glycol, 1,2-propanediol, 1,3-propanediol, 1,2-butanediol, 1,3-butanediol, 1,4-butanediol, 2-ethyl-1,3-propanediol, 2-methylpropanediol, 2-butyl-2-ethylpropanediol, 2-ethyl-1,3-hexanediol, 1,3-neopentyl glycol, 2,2-dimethyl-1,3-pentanediol, 1,6 hexanediol, 1,2- and 1,4-cyclohexanediol, bisphenol A, 1,2- and 1,4-bis(hydroxymethyl)cyclohexane, bis(4-hydroxycyclohexyl)methane, adipic acid bis(ethylene glycol ester), ether alcohols such as diethylene glycol, triethylene glycol and dipropylene glycol, perhydrogenated bisphenols, 1,2,4-butanetriol, 1,2,6-hexanetriol, trimethylolethane, trimethylolpropane, trimethylolhexane, glycerol, pentaerythritol, dipentaerythritol, mannitol and sorbitol, and also chain-terminating monoalcohols having 1 to 8 carbon atoms such as propanol, butanol, cyclohexanol, benzyl alcohol, hydroxypivalic acid and mixtures thereof. Preferably employed polyols are: glycerol, trimethylolpropane, neopentyl glycol, diethylene glycol, and pentaerythritol.

The polybasic acids useful in practicing the present invention include compounds such as, for example, aliphatic, cycloaliphatic, saturated or unsaturated and/or aromatic polybasic carboxylic acids, such as, for example, dicarboxylic, tricarboxylic and tetracarboxylic acids. These compounds can be used alone or as a mixture of one or more polybasic acids. Suitable examples of polybasic acids useful in practicing the instant invention include acids such as, for example, phthalic acid, isophthalic acid, adipic acid, terephthalic acid, tetrahydrophthalic acid, hexahydrophthalic acid, endomethylenetetrahydrophthalic acid, succinic acid, glutaric acid, sebacic acid, azelaic acid, trimellitic acid, pyromellitic acid, fumaric and maleic acid and the like, or mixtures thereof. The preferred polybasic acids are isophthalic acid and adipic acid, or mixtures thereof.

Polybasic acids, as used herein, are broadly defined to include anhydrides of the polybasic acids such as, for example, maleic anhydride, phthalic anhydride, succinic anhydride, tetrahydrophthalic anhydride, hexahydrophthalic anhydride, trimellitic anhydride, or mixtures thereof. These compounds can be used alone or as a mixture of one or more polybasic acids.

In one embodiment the polyurethane polymers are prepared from a polyol having at least one sulfonate group and aliphatic or aromatic diacids, without ethylenic groups. In another embodiment, the polyurethane polymers are prepared from a polyol having at least one sulfonate group and optional aliphatic or aromatic diacids with ethylenic groups.

Preferred isocyanates for practicing the invention are isocyanates having 4 to 25 carbon atoms and from 2 to 4 isocyanate groups per molecule. Particularly preferred isocyanates are aliphatic, cycloaliphatic, araliphatic or aromatic diisocyanates such as, for example: 1,2-ethylene diisocyanate, 1,4-tetramethylene diisocyanate, 1,6-hexamethylene diisocyanate, 2,2,4-trimethyl-1,6-hexamethylene diisocyanate, 2,4,4-trimethyl-1,6-hexamethylene diisocyanate, 1,12-dodecane diisocyanate, cyclobutane 1,3-diisocyanate, cyclohexane 1,3-diisocyanate, cyclohexane-1,4-diisocyanate, bis(4-isocyanatocyclohexyl)methane (Des W), 1-methylcyclohexane-2,2-diisocyanate, 1-methylcyclohexane-2,6-diisocyanate, 3-isocyanatomethyl-3,5,5-trimethyl-cyclohexyl isocyanate (isophorone diisocyanate, IPDI), 2,5-bis(isocyanatomethyl)-8-methyl-1,4-methano-decahydronaphthalene, 3,5-bis(isocyanatomethyl)-8-methyl-1,4-methano-decahydronaphthalene, 2,6-bis-(isocyanato)-4,7-methano-hexahydroindane, dicyclohexyl 2,4'-diisocyanate, dicyclohexyl 4,4'-diisocyanate, 2,6-hexahydrotolylene diisocyanate, 2,6-hexahydrotolylene diisocyanate, perhydro-2,4'-diphenylmethane diisocyanate, perhydro-4,4'-diphenylmethane diisocyanate, 1,3-phenylene diisocyanate, 1,4-phenylene diisocyanate, 4,4'-biphenyl diisocyanate, 4,4'-diisocyanato-3,3'-dimethoxybiphenyl, 4,4'-diisocyanato-3,3'-dimethylbiphenyl, 3,3'-diphenylbiphenyl-4,4'-diisocyanate, 2,4'-diphenylmethane diisocyanate, 4,4'-diphenylmethane diisocyanate (MDI), naphthalene 1,5-diisocyanate, toluene diisocyanates (TDI), such as, for example, 2,4-toluene diisocyanate and 2,6-toluene diisocyanate, N,N'-(4,4'-dimethyl-3,3'-diisocyanato-diphenyl)uretdione, m-xylylene diisocyanate, tetramethylxylylene diisocyanate, and the like; or triisocyanates, such as, for example, 2,4,4'-triisocyanato-diphenyl ether, 4,4',4"-triisocyanatotriphenylmethane, tris(4-isocyanatophenyl) thiophosphate, and the like; polyisocyanates (isocyanurates) based on 1,6-hexamethylene diisocyanate such as, for example, 1,3,5-tris-(6-isocyanato-hexyl)-[1,3,5]triazinane-2,4,6-trione (DESMODUR™ N-3300) and 1,3-bis-(6-isocyanato-hexyl)-1-[(6-isocyanato-hexylamino)-oxomethyl]-urea (DESMODUR N-75); or mixtures thereof. More preferred isocyanates include toluene diisocyanates such as, for example, 2,4-toluene diisocyanate, 2,6-toluene diisocyanate, 1,6-hexamethylene diisocyanate, 2,4'-diisocyanato-diphenylmethane, 4,4'-diisocyanato-diphenylmethane, 4,4'-diphenylmethane diisocyanate (MDI), 3-isocyanato-methyl-3,5,5-trimethyl-cyclohexyl isocyanate (IPDI), bis(4-isocyanatocyclohexyl)methane (Des W), dicyclohexyl 2,4'-diisocyanate, dicyclohexyl 4,4'-diisocyanate; or mixtures thereof. Most preferred isocyanates are 2,4-toluene diisocyanate, and 2,6-toluene diisocyanate, 1,6-hexamethylene diisocyanate, 2,4'-diisocyanato-diphenylmethane, 4,4'-diisocyanato-diphenylmethane, 4,4'-diphenylmethane diisocyanate (MDI), 3-isocyanatomethyl-3,5,5-trimethyl-cyclohexyl isocyanate (IPDI), bis(4-isocyanatocyclohexyl)methane (Des W), or mixtures thereof.

The vinyl polymer (second polymer) is prepared from unsaturated monomers containing a carbon-carbon double bond, including, acids such as, for example, acrylic acid, methacrylic acid, and the like; esters such as, for example, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, 2-(acetoacetoxy)ethylmethacrylate, and the like; hydroxy functional acrylates such as, for example, hydroxyethyl acrylate, hydroxyethyl methacrylate and the like; amides such as, for example, acrylamide, methylacrylamide, diacetone acrylamide, and the like; vinyl monomers such as, for example, styrene, α-methyl styrene, vinyl toluene, and the like vinyl esters such as, for example, vinyl acetate, vinyl propionate and the like or mixtures thereof. A specific vinyl polymer is a poly(meth)acrylate polymer. Optionally, some or all of the monomers can be added to the polyurethane dispersion before the monomer polymerization. The monomers for preparing the vinyl polymer can be added to the dispersion just prior to and/or during the free radical polymerization step.

A specific group of unsaturated monomers that form the second polymer include vinyl monomers selected from the group consisting of acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, acrylamide, methylacrylamide, styrene, α-methyl styrene, vinyl toluene, vinyl acetate, vinyl propionate, and mixtures thereof.

Sulfonate functional polyols, such as an alkyd, useful in practicing the invention can be prepared by the step growth polymerization process, which is well known to those familiar with the art. A typical sulfonate functional alkyd could be based upon a composition of (SSIPA/Linoleic acid/IPA/NPG/TMP) which has a hydroxyl number of 201. This alkyd would then be reacted with either monomeric and/or polymeric isocyanates in the presence of ethylenically unsaturated monomers. Typically, the amount of dicarboxylic acid sulfo-monomer useful in the PU polymers of present invention can be from about 3 to about 10 weight percent based on the weight of the polyurethane polymer. More preferably the amount of dicarboxylic acid sulfo-monomer useful in the present invention can be from about 4% to about 8%. Most preferably the amount of dicarboxylic acid sulfo-monomer useful in the present invention can be from about 5.5% to about 7.5%.

The SSIPA and LSIPA functional polyols can also be prepared by reacting polybasic acid compounds with a compound containing an amine to provide an amide functional polyester or alkyd. Typical amine compounds useful in preparing the polyurethanes of the invention include polyamines such as, for example, ethylene diamine, diethylene triamine, triethylene tetramine, melamine 1,2-diamino propane, 1,3-diamino propane, and the like; or amino alcohols, such as, for example, 2-amino-propan-1-ol, 3-amino-propan-1-ol, dimethylisopropanolamine, 2-amino-2-methyl-1-propanol, dimethylethanolamine and the like. The amide containing polymers can be designed to be amine and/or hydroxy functional.

Another advantage to using sulfonate functional monomers in the preparation of a water dispersible polyurethane-vinyl polymer composition of the invention is when an aromatic isocyanate is used. The aromatic isocyanates are highly reactive. As process temperatures exceed 60° C., the isocyanate group can react with a carboxyl group, which may lead to poor aqueous stability or gelation of the reaction. If the majority of carboxyl functional aqueous polyurethanes are prepared using dimethylol propionic acid (DMPA), an organic solvent is usually required to dissolve the DMPA to process the reaction at temperatures below 60° C. As a result, the aromatic polyurethane dispersions have high VOC. Further difficulties can occur if the polyurethane prepolymer is to be chain extended. Before chain extension, the polyurethane prepolymer must be dispersed into water or water must be added to the polyurethane. However, if salting of the carboxyl functionality with a base is used, the base can catalyze the carboxyl isocyanate reaction. This base catalysis of the carboxyl isocyanate reaction requires the use of difficult and proprietary processing techniques which are not required with the aromatic isocyanate based sulfonate functional polyurethane dispersions of the present invention.

The water dispersible polyurethane-vinyl polymer composition (dispersion) can be prepared using either an excess of isocyanate or an excess of hydroxyl. If excess hydroxy groups are used, the reaction will proceed until less than 0.3% isocyanate functionality remains. At this point the polyurethane (PU) polymer can be dispersed into water and a free radical initiator is utilized to polymerize the ethylenically unsaturated monomers. If a hydroxy terminated PU polymer is desired then the prepolymer should have an excess of hydroxy functionality, typically in the range of an equivalent OH/NCO ratio of from about 1:1 to about 4:1. A more preferred OH/NCO ratio is from is from about 1:1 to about 2:1.

The non-chain extended oil and/or fatty acid modified polyurethane dispersions prepared using an excess of hydroxyl groups can provide performance properties similar to chain extended polyurethane dispersions, without the use of chain extension agents. These compositions can form inter penetrating networks having a high Tg and high molecular weights because of the polymerization with ethylenically unsaturated monomers. This advantage is observed in the formulation of water based oil and/or fatty acid modified urethanes.

Typically, the hydroxy terminated PU polymers can have a hydroxy number of from about 0 to about 150.

Alternatively, the water dispersible polyurethane-vinyl polymer composition (dispersion) can be chain extended using an excess of isocyanate. Chain extended polyurethane dispersions are prepared using a urethane prepolymer in the presence of ethylenically unsaturated monomers and a prepolymer with an excess of isocyanate functionality, typically in the range of an equivalent NCO/OH ratio of about 1.05:1 to about 3:1. Preferably the NCO/OH ratio is from about 1.6:1 to about 2.2:1.

The polyurethane polymer is subsequently dispersed into water and optionally chain extended with an active hydrogen compound containing multifunctional, preferably a di or tri functional, reactive species. Preferably, a multifunctional amine can facilitate chain extension. If a chain extension agent is not added to the dispersion, water can facilitate the chain extension. After chain extension, a free radical initiator is utilized to polymerize the ethylenically unsaturated monomers.

Examples of chain extenders useful for practicing the instant invention include compounds such as, for example, alkyl amino alcohols, cycloalkyl amino alcohols, heterocyclic amino alcohols, polyamines, hydrazine, substituted hydrazines, hydrazide, amides, water and mixtures thereof.

Suitable examples of polyamines, include ethylene diamine, diethylene triamine, triethylene tetra amine, melamine and the like.

A specific polyamine chain extender is ethylene diamine. Another specific chain extender composition includes polyalkene oxide, such as, for example, polyalkene oxide; a hydroxyl functional latex or an amine functional latex.

The water dispersible polyurethane-vinyl polymer composition (dispersions) of the invention can have pendant groups on the backbone of the polymerized ethylenically unsaturated monomers. Examples of suitable groups include acetoacetate, diacetoneacrylamido, acetyl, benzoyl and the like. These groups can be used to crosslink the vinyl polymer using the unsaturation present on the alkyd portion of the polyurethane or with residual amine functionality present on the urethane polymer.

Polymerization of the ethylenically unsaturated monomers of the water-based polyurethane-vinyl polymer compositions can be accomplished by using a free radical source. As used herein, a "free radical source" refers to any known effective free radical vinyl polymerization initiator such as, for example, sodium, potassium and ammonium persulfates; perphosphates, perborates, percarbonates, and peroxides such as hydrogen peroxide, tert-butyl hydroperoxide, tert-butyl peroctoate, and similar percarboxylic acid esters, azobisisobutyronitrile (AIBN), 1,1'-azobiscyclohexanecarbonitrile (AICN), 4,4'-azobis(4-cyanovaleric acid) (AICA), and the like. The amount of free radical initiator is from about 0.1 to about 3% by weight of monomers. Preferably the amount of free radical is from about 0.1 to about 2% by weight of monomers.

The water dispersible polyurethane-vinyl polymer compositions (or dispersions) of the invention also can include driers. The driers can be added before or after preparing the polyurethane-water dispersion. Typical driers include metal salts of cobalt, manganese, lead, zirconium, calcium, cerium, lanthanum, and neodymium salts or combinations there of. Examples of suitable metal drier compounds are known in the art. See, for example, Wicks, Z. W., Jones, F. N., and Pappas, S. P.: *"Organic Coatings Science and Technology"*. *Vol II*, 1994, New York, John Wiley & sons, Inc. The water dispersible polyurethane-vinyl polymer compositions can also include compounds such as, for example, 1,10 phenanthroline, bipyridine, and the like. These compounds can function as accelerators in combination with the metal driers. Preferably the amount or drier is from about 50 to about 1000 ppm (by weight) of metal ion based on the weight of polyurethane polymer. More preferably the amount of drier is from about 50 to about 300 ppm (by weight) of metal ion.

The water dispersible polyurethane-vinyl polymer compositions (or dispersions) of the invention also can include other ingredients such as plasticizers, pigments, colorants, dyes, surfactants, thickeners, heat stabilizers, leveling agents, anti-cratering agents, fillers, sedimentation inhibitors, ultraviolet-light absorbers, and the like to modify properties. Additives such as heat stabilizers, ultraviolet-light absorbers, etc., can be dispersed in the reaction mixture and become an integral part of the urethane polymer. Alternatively, the additives may be added after the water dispersible polyurethane-vinyl polymer compositions (or dispersions) have been formed. The resulting water dispersible polyurethane-vinyl polymer compositions (or dispersions) have low or zero VOC and improved mar and scuff resistance properties, and are air dryable, have a high hardness and are resistant to abrasions, chemicals, and stains.

Pigments for use with the present invention are known in the art. Suitable pigments include titanium dioxide white, carbon black, lampblack, black iron oxide, red iron oxide, yellow iron oxide, brown iron oxide (a blend of red and yellow oxide with black), phthalocyanine green, phthalocyanine blue, organic reds (such as naphthol red, quinacridone red and toluidine red), quinacridone magenta, quinacridone violet, DNA orange, and/or organic yellows (such as Hansa yellow).

The following abbreviations have been used herein:
IPA—Isophthalic Acid
AA—Adipic Acid
SSIPA—5-(Sodiosulfo) Isophthalic Acid
LSIPA—5-(Lithiosulfo) Isophthalic Acid
MMA—Methyl Methacrylate
TMP—Trimethylol Propane
NPG—Neopentyl Glycol
DEG—Diethylene Glycol
DBTDL—Dibutyl Tin Dilaurate The advantages of the water dispersible polyurethane-vinyl polymer compositions (or dispersions) of the present invention are further illustrated in the following illustrative examples. All amounts are provided as parts by weight (weight parts).

Example 1

Preparation of SSIPA Functional Alkyd

Step A

A reactor was charged with 11.8 parts SSIPA, 20.7 parts neopentyl glycol, and 950 ppm of FASCAT™ 4100 tin catalyst, from Elf Atochem. The reaction mixture was heated and stirred for about 4 hours and water was removed. The mixture was heated and tested until a test sample has an acid number of less than 2 mg of KOH/gram. Linoleic Acid (67.5 parts) was added to the mixture and the reaction cooled to room temperature.

Step B

The reaction product prepared in Step A (52 parts) was combined with 16 parts of trimethylol propane, 11.2 parts isophthalic acid and 333 ppm FASCAT™ 4100 tin catalyst from Elf Atochem. The mixture was heated and stirred for about 3.5 hours until an acid number of less than 5 mg of KOH/gram was achieved.

The physical properties of the SSIPA functional alkyd were:
MW=537 OH#=201 AV<4.0.

Example 2

Preparation of a Water Dispersible SSIPA Functional Polyurethane-Vinyl Polymer

The SSIPA functionalized alkyd, prepared in Example 1, 272 grams, was reacted with 54 grams of toluene diisocyanate in the presence of 80.3 grams MMA and 75 ppm 2,6-di-tert-butyl-4-methylphenol under an air sparge. The mixture was heated to 60° C. and stirred until the free isocyanate level was <0.3% as determined by titration with hydrochloric acid.

A dispersion of the polyurethane polymer blend was prepared by addition of 365 grams of deionized water. The free radical polymerization of the MMA was conducted using a redox initiation system of t-butyl hydroperoxide (70% solution in water) (1.2 grams) diluted with 200 grams of deionized water and isoascorbic acid (0.8 grams) diluted with 20 grams of deionized water. The isoascorbic acid solution was neutralized with aqueous ammonia to a pH of 7-8 and added to the polyurethane dispersion. The t-butyl hydroperoxide solution was added dropwise to the dispersion over three hours at 40° C. under a nitrogen atmosphere. A catalytic level of HAMPOL™ 4.5% iron catalyst (supplied by Hampshire) was added to the dispersion just prior to the isoascorbic acid addition.

The properties of the dispersion are outlined in the table below:

|  | EXAMPLE 2 |
| --- | --- |
| NVM % | 43.9% |
| pH | 7.4 |
| VOC (lb/gal) | Zero* |

*A trace level of VOC will result from the formation of t-butanol as a byproduct of the t-butyl hydroperoxide.

Example 3

Preparation of LSIPA Functional Alkyd

A reactor was charged with 135 parts LSIPA, 397.5 parts DEG, 157.5 parts TMP, and 1500 ppm of FASCAT 4100 tin catalyst from Elf Atochem. The reaction mixture was heated and stirred for about 4 hours and water was removed. The mixture was heated and tested until a sample has an acid number of less than 2 mg of KOH/gram. 300 parts soya fatty acid and 510 parts AA were then added to the mixture, and the mixture was heated and stirred for about 4.0 hours until an acid number of less than 5 mg of KOH/gram was achieved.

The physical properties of the LSIPA functional alkyd were:
MW=1343 OH#83 AV<4.0.

Example 4

Preparation of a Water Dispersible LSIPA Functional Polyurethane-Vinyl Polymer

The LSIPA functionalized alkyd, prepared in Example 3, 243 grams, was reacted with 82 grams of IPDI in the presence of 81 grams MMA and 200 ppm 2,6-di-tert-butyl-4-methylphenol under an air sparge. The mixture was heated to 80° C. under an air sparge, whereupon 200 ppm DBTDL was added and the reaction processed until the isocyanate level was below 9.2%. The urethane prepolymer was cooled to 65° C. The urethane prepolymer was then dispersed into 632 grams 40° C. deionized water and subsequently chain extended with a mix of 8.5 grams of ethylene diamine and 24 grams of deionized water. The free radical polymerization of the MMA was conducted using a redox initiation system of t-butyl hydroperoxide (70% solution in water) (2.25 grams) diluted with 90 grams of deionized water and isoascorbic acid (1.75 grams) diluted with 10 grams of deionized water. The isoascorbic acid solution was neutralized with aqueous ammonia to a pH of 7-8 and added to the polyurethane dispersion. The t-butyl hydroperoxide solution was then added dropwise to the dispersion over three hours at 40° C. under a nitrogen atmosphere. A catalytic level of HAMPOL 4.5% iron catalyst (supplied by Hampshire) was added to the dispersion just prior to the isoascorbic acid addition. The dispersion was then adjusted to 35% solids with deionized water.

The properties of the dispersion are outlined in the table below:

|  | EXAMPLE 4 |
| --- | --- |
| NVM % | 35.0% |
| pH | 7.4 |
| VOC (lb/gal) | Zero* |

*A trace level of VOC will result from the formation of t-butanol as a byproduct of the t-butyl hydroperoxide.

Example 5

Performance Results

A 3 mil wet film of the water dispersible LSIPA functional polyurethane-vinyl polymer from Example 4 was applied to LENETA™ test charts and allowed to dry at room temperature.

| TEST | EXAMPLE 5 |
| --- | --- |
| Dry time | <20 minutes |
| Gloss 60 degree | 92 |
| Gloss 20 degree | 74 |

Gloss testing was performed in accordance with ASTM test method D-523 with a micro-TRI-gloss unit.

The above specification, examples and data provide a complete description of the manufacture and use of the composition of the invention. Since many embodiments of the invention can be made without departing from the spirit and scope of the invention, the invention resides in the claims hereinafter appended.

All patents, patent applications, and literature cited in the specification are hereby incorporated by reference in their entirety. In the case of any inconsistencies, the present disclosure, including any definitions therein will prevail.

What is claimed is:

1. A process for preparing a polyurethane dispersion, which process comprises:
   a) providing a reaction mixture comprising a hydroxy-functional sulfonated unsaturated alkyd, an isocyanate and one or more vinyl monomers, thereby forming a blend containing the vinyl monomers and a sulfonated polyurethane polymer containing ethylenic groups;
   a) dispersing the blend in water; and
   b) reacting the vinyl monomers by free radical polymerization.

2. A process according to claim 1 wherein the hydroxy-functional sulfonated unsaturated alkyd is derived from linseed oil, safflower oil, tall oil, cottonseed oil, ground nut oil, tung oil, wood oil, ricinene oil, sunflower oil, soya oil, castor oil, dehydrated castor oil, soya fatty acid, dehydrated castor fatty acid, linolenic fatty acid, ricinoleic fatty acid or linoleic fatty acid.

3. A process according to claim 1 wherein the hydroxy-functional sulfonated unsaturated alkyd is derived from a sulfonated dicarboxylic acid.

4. A process according to claim 3 wherein the sulfonated dicarboxylic acid comprises 5-(sodiosulfo)isophthalic acid or 5-(lithiosulfo)isophthalic acid.

5. A process according to claim 1 wherein the sulfonated polyurethane polymer contains sulfonate groups in the form of lithium, sodium or potassium alkali metal salts.

6. A process according to claim 1 wherein the one or more vinyl monomers comprise acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, 2-(acetoacetoxy)ethylmethacrylate, acrylamide, methylacrylamide, diacetone acrylamide, styrene, α-methyl styrene, vinyl toluene, vinyl acetate, vinyl propionate or mixture thereof and wherein the one or more vinyl monomers react by free radical polymerization to form a polymer with pendant acetoacetate, diacetoneacrylamido, acetyl or benzoyl groups that can crosslink using unsaturation present on an alkyd portion of the sulfonated polyurethane polymer.

7. A process according to claim 1 wherein the sulfonated polyurethane polymer has terminal vinyl groups.

8. A process according to claim 1 wherein the sulfonated polyurethane polymer has terminal isocyanate groups.

9. A process according to claim 8 further comprising chain extending the terminal isocyanate groups with one or more active hydrogen containing compounds.

10. A process according to claim 9 wherein the one or more active hydrogen containing compounds comprise an alkyl amino alcohol, cycloalkyl amino alcohol, heterocyclic amino alcohol, polyamine, hydrazine or hydrazines, hydrazide, amide, water, ethylene diamine, diethylene triamine, triethylene tetra amine, melamine or a mixture thereof.

11. A process according to claim 9 wherein the one or more active hydrogen containing compounds comprise a polyalkene oxide, hydroxyl functional latex or amine functional latex.

12. A process according to claim 1 wherein the sulfonated polyurethane polymer has a hydroxy number of from about 0 to about 150.

13. A process according to claim 1 further comprising adding a metal salt drier to the polyurethane dispersion.

14. A process according to claim 1 wherein the polyurethane dispersion is air-curable at room temperature.

15. A reaction mixture for use in the process of claim 1, comprising:
   a) a hydroxy-functional sulfonated unsaturated alkyd;
   b) an isocyanate; and
   c) one or more vinyl monomers.

16. A reaction mixture according to claim 15 wherein the hydroxy-functional sulfonated unsaturated alkyd is derived from linseed oil, safflower oil, tall oil, cottonseed oil, ground nut oil, tung oil, wood oil, ricinene oil, sunflower oil, soya oil, castor oil, dehydrated castor oil, soya fatty acid, dehydrated castor fatty acid, linolenic fatty acid, ricinoleic fatty acid or linoleic fatty acid.

17. A reaction mixture according to claim 15 wherein the hydroxy-functional sulfonated unsaturated alkyd is derived from 5-(sodiosulfo)isophthalic acid or 5-(lithiosulfo)isophthalic acid.

18. A reaction mixture according to claim 15 wherein the one or more vinyl monomers react by free radical polymerization to form a polymer with pendant acetoacetate, diacetoneacrylamido, acetyl or benzoyl groups that can crosslink using unsaturation present on an alkyd portion of the sulfonated polyurethane polymer.

19. A reaction mixture according to claim 15 wherein the sulfonated polyurethane polymer has terminal isocyanate groups.

20. A reaction mixture according to claim 19 further comprising a chain extension agent containing active hydrogen atoms.

21. A reaction mixture according to claim 20 wherein the chain extension agent comprises an alkyl amino alcohol, cycloalkyl amino alcohol, heterocyclic amino alcohol, polyamine, hydrazine, substituted hydrazine, or hydrazines, hydrazide, amide, water, ethylene diamine, diethylene triamine, triethylene tetra amine, melamine or a mixture thereof.

22. A reaction mixture according to claim 15 wherein the isocyanate comprises an aromatic isocyanate.

23. A process according to claim 1 wherein the isocyanate comprises an aromatic isocyanate.

* * * * *